United States Patent [19]

Wilkinson

[11] Patent Number: 4,587,286

[45] Date of Patent: May 6, 1986

[54] DISPERSION OF POLY(ETHYLENE TETRAFLUOROETHYLENE)

[76] Inventor: James Wilkinson, P.O. Box 26, Williamstown, W. Va. 26187

[21] Appl. No.: 588,201

[22] Filed: Mar. 12, 1984

[51] Int. Cl.$^4$ .............................................. C08K 5/06
[52] U.S. Cl. .................... 524/375; 427/385.5; 428/421; 524/378; 524/388; 524/544; 524/535
[58] Field of Search ............... 524/375, 376, 377, 386, 524/387, 388, 520, 535, 544

[56] References Cited

U.S. PATENT DOCUMENTS

| | | | |
|---|---|---|---|
| 3,074,901 | 1/1963 | Lantos | 524/520 |
| 3,769,252 | 10/1973 | Fujii | 524/520 |
| 4,039,497 | 8/1977 | Troussier | 524/520 |
| 4,150,008 | 4/1979 | Vassiliou | 524/520 |

FOREIGN PATENT DOCUMENTS

| | | | |
|---|---|---|---|
| 157956 | 8/1954 | Australia | 524/520 |
| 1018269 | 1/1966 | United Kingdom | 524/520 |
| 1137349 | 12/1968 | United Kingdom | 524/520 |

Primary Examiner—Christopher A. Henderson
Attorney, Agent, or Firm—Oldham, Oldham & Weber Co.

[57] ABSTRACT

The dispersion of poly(ethylene tetrafluoroethylene) containing various aids such as a viscosity improver, wetting agent, water, solvent, and an anti-sag agent. The dispersion is sprayable and thick coats can be applied to an article or object. Upon cure, the coating exhibits very good physical properties such as toughness, wear and abrasion resistance, and corrosion resistance.

4 Claims, No Drawings

4,587,286

DISPERSION OF POLY(ETHYLENE TETRAFLUOROETHYLENE)

TECHNICAL FIELD

The present invention relates to a dispersion containing poly(ethylene tetrafluoroethylene). When applied, a very tough and abrasion resistant coating is formed.

BACKGROUND ART

Heretofore, poly(ethylene tetrafluoroethylene) has been utilized in various applications wherein a tough, abrasion-resistant, and corrosiveresistant polymer was desired. However, it has generally been applied as through a coating process, for example extruding or the like. The polymer cannot be applied as a powder or in fine form other than through electrostatically spraying, followed by baking. Such spraying requires that the polymer be cryogenically ground to approximately 50 to 60 microns and then applied. However, such coating is very thin, that is under 3 mils and generally under 2 mils in thickness per coating. The finished product, even though baked, is generally rough and thus not aesthetically appealing. The coating via an electrostatic application does not yield the good properties obtained as by extruder coating, in that the toughness is diminished, the dielectric resistance is much poorer, the adhesion is much lower, and the abrasion resistance is poor.

U.S. Pat. No. 4,321,177 relates only to a solution for spraying a perfluoroalkoxy resin. Moreover, it also fails to teach or suggest applicant's present formulation or process.

DISCLOSURE OF INVENTION

It is therefore an aspect of the present invention to provide a dispersion of poly(ethylene tetrafluoroethylene).

It is another aspect of the present invention to provide a dispersion of poly(ethylene tetrafluoroethylene), as above, which when applied and cured has good physical properties.

It is a further aspect of the present invention to provide a dispersion of poly(ethylene tetrafluoroethylene), as above, which is sprayable.

It is yet a further aspect of the present invention to provide a dispersion of poly(ethylene tetrafluoroethylene), as above, wherein said dispersion comprises a viscosity improver, a wetting agent, water, hydrocarbon solvents, and an anti-sag agent.

It is yet another aspect of the present invention to provide a dispersion of poly(ethylene tetrafluoroethylene), as above, wherein a smooth coating is produced.

In general, an aspect of the present invention relates to a dispersion of a poly(ethylene tetrafluoroethylene) comprising: from about 20 to about 75 parts by weight of the poly(ethylene tetrafluoroethylene), from about 7 to about 23 parts by weight of a viscosity improver; from about 2 to about 17 parts by weight of a wetting agent; from about 30 to about 80 parts by weight of water; and from about 0.1 to about 3.0 parts by weight of a bridging agent, and an amount of a hydrocarbon solvent such that the total amount of solids in said dispersion is from about 20 percent to about 60 percent.

BEST MODE FOR CARRYING OUT THE INVENTION

The poly(ethylene tetrafluoroethylene) dispersion of the present invention has a formulation such that it is readily applied, e.g. by spraying, and yet retains its excellent physical properties. By the term spraying, it is meant that it is sprayable generally in a "wet" sense, that is it has solvents therein, and not as through an electrostatic process. The solvent of the formulation is a hydrocarbon, for example an aromatic solvent having from 6 to about 12 carbon atoms. Examples of suitable solvents include xylene, toluene, ethyl benzene, and the like, with toluene being preferred. The amount of solvent in the formulation generally ranges from about 7 to about 30 parts by weight, desirably from about 15 to about 25 parts by weight with about 18 to about 22 parts being preferred.

The dispersion also contains a wetting agent. Generally, any suitable wetting agent can be utilized as in an amount of from about 2 to about 17 parts by weight, desirably from about 4 to about 14, and preferably from about 8 to 12 parts. A suitable group of wetting agents are the Triton X series manufactured by Rohm & Haas. These wetting agents contain the various alkyl phenol ethylene oxide condensation products having from about 9 to about 15 moles of ethylene oxide. Moreover, combinations of the various Triton series can be utilized such as Triton X-100 which has from about 9 to about 11 moles of ethylene oxide in the amount of from about 1.5 to about 12 parts by weight, desirably from 3 to 10 parts by weight, and preferably from about 6 to 8 parts by weight in combination with a slightly smaller amount of Triton X-102 which has about 12 to about 13 moles of ethylene oxide in an amount of from about 0.7 to about 5 parts by weight, 1.5 to about 4 parts by weight, and preferably from 2 to about 4 parts by weight. Examples of other suitable wetting agents include the various other Triton wetting agents, the Igepal surfactants manufactured by GAF, the various sulfonic surfactants or wetting agents manufactured by the Jefferson Chemical Company, and the like.

A binding agent or more precisely a viscosity improver is also utilized in the present invention to help maintain the dispersion. An example of a preferred compound is glycerol. Examples of other viscosity improvers include glycerin. The amount of the viscosity improver is from about 7 to about 23 parts, desirably from about 8 to 18, and preferably from about 10 to 14 parts by weight. Since the formulation is sprayable, care should be taken not to utilize too large amounts in that the dispersion would be too viscous and hence difficult to spray.

Water is another compound utilized in the present dispersion formulation. Generally, any amount of water can be utilized so long as a suitable dispersion is obtained. Generally from about 30 to about 80 parts by weight is utilized, desirably from about 40 to about 80 and preferably from about 55 to about 65 parts by weight.

The poly(ethylene tetrafluoroethylene) of the present invention can be obtained from the DuPont Company under the trademark of TEFZEL. Actually the polymer is essentially a copolymer of ethylene and tetrafluoroethylene monomers. Generally, the polymer is of such a size that it is suitable for spraying under various conventional spraying apparatus. Thus, the particles of the polymer generally range in size from about 20 to about 80 microns. Typically and preferably, about 45 to about 55 parts of the polymer is utilized. Depending upon the type of application, the type of spraying apparatus, and the like, larger or smaller amounts can be utilized. Usually, an amount of from about 20 to about 75 parts by weight of the polymer is suitable with from about 30 to about 60 parts by weight being desired.

In the formulation of the present dispersion, it is an important aspect of the present invention to utilize small amounts of bridging compounds such as butyl Cellosolve, that is ethylene glycol monobutyl ether. Otherwise, there is separation of the coating with the result that mud cracking is evident in the finished product. In other words, a suitable coating upon a substrate is simply not formed in that it lacks good physical properties, adhesion, and the like. Thus, the utilization of a bridging compound is essential in forming a suitable dispersion formulation according to the present invention. The amount of bridging compound generally ranges from about 0.1 to about 3.0, desirably from about 0.5 to 1.5, and preferably from about 0.8 to abut 1.2 parts by weight.

Other ethers can also be utilized as an additive to help prevent separation. For example, from about 0.1 to about 1.5, desirably from about 0.3 to about 1.1, and preferably from about 0.4 to about 0.8 parts of an antiseparation agent such as butyl Carbitol, that is diethylene glycol monobutyl ether can be utilized.

Another important aspect of the present invention in order to obtain a suitable dispersion formulation so that upon application to an object, sag or run is prevented, is the addition of a small amount of an anti-sag agent. Generally, the amount of such an agent ranges from about 0.1 to about 1.0, desirably from about 0.2 to about 0.7, and preferably from about 0.4 to about 0.6 parts by weight. Care should be taken not to add too much of this agent in that the entire formulation would tend to be unduly viscous. An example of such anti-sag agents includes styrene. In other words, such agents add bulk to the sprayed solution or actually polymerize upon heating to prevent sag or running of the coating.

Various other additives or compounds well known to the art can also be utilized in the present invention. For example, various dyes, pigments, UV stabilizers, antiozonates, and the like, well known to the industry and to those skilled in the art of polymer coating can be utilized in various amounts in the present invention.

In preparing the dispersion formulation of the present invention, the order of addition is usually important. First, the solvent is added to a suitable container. The viscosity improver is then added thereto and mixed. Next, the surfactants in the form of a wetting agent is added. Separately, water, the bridging agent and the anti-separation agent are then added to each other and mixed. This mixture is then added to the above mixture and mixed. Next, the poly(ethylene tetrafluoroethylene) is added and mixed to form a dispersion. Finally, the anti-sag agent is added and blended therein. The above order is generally followed in that the water and the bridging and antiseparation agent are soluble together and then added to the previous mixture in order to form a compatible mixture. The anti-sag agent is added last since it is generally unstable when exposed to air. Thus, it is added last, briefly mixed, and then the dispersion mixture is capped or sealed. The mixture can generally be stored indefinitely until used.

Although the dispersion formulation can be applied in any manner, for example as through coating, brushing, dipping, and the like, it is ideally suitable for spraying. It can be utilized in association with any conventional spraying apparatus or spray gun and applied in a thickness up to about 12 or 15 mils per coat. Of course, additional coats can be applied. Naturally, when spraying is utilized, different areas of an apparatus or object can be coated to a different thickness, if desired. Upon application of the proper coating, the item is heated up to a temperature of no more than 550° F. in order to cure. It is important that this temperature not be exceeded in that a suitable good cure otherwise is not achieved. The curing temperature is thus generally from about 495° F. to about 550° F., with a preferred temperature of about 520° F. to about 530° F. The length of cure will, of course, generally depend upon the thickness of the coating and the like.

The dispersion formulation of the present invention has been found to adhere extremely well to various metals such as iron, steel, nickel, and aluminum. Thus, no primer is needed. The cured coating, unlike the prior art electrostatic coating of the same polymer, surprisingly has very good physical properties. For example, it has very good wear and abrasion resistance. Additionally, it has excellent adhesion to various metals. It is also very good corrosive resistant in that it can generally withstand temperatures up to 350° F. of any industrial acids. In effect, the cured dispersion formulation of the present invention has properties of an extruded part and yet can be applied as by dipping, brushing, or spraying. The coating also has very good impact resistance.

Areas of use include wherever such properties are desired. For example, the dispersion formulation of the present invention can be applied to pumps, valves, various pipe fittings, mixers, thermal weld fittings, and the like. It can also be used as a wire coating in that it has excellent toughness, abrasion resistance, and a very good dielectric constant. Moreover, the coatings produced have smooth surface.

The invention will be better understood by reference to the following example.

EXAMPLE 1

The following dispersion formulation was made up according to the present invention.

Toluene—20.00 parts
Glycerin—12.00 parts
Triton 100—7.00 parts
Triton 102—3.00 parts
$H_2O$—60.00 parts
Butyl Cellosolve—1.00 part
Tefzel—50.00 parts
Styrene—0.50 parts
Butyl Carbitol—0.50 parts To the toluene was added the glycerine and briefly mixed. Then the wetting agent was added and mixed. In a separate vessel, butyl cellosolve and butyl carbitol was added to the water component and briefly mixed. This mixture was then added to the prior mixture and briefly mixed. The TEFZEL was then added. The styrene was then added to the mixture and stirred for a short period of time. A "Q" panel (carbon steel) having a thickness of 34 mil was coated with the mixture utilizing a siphon type, Model 62 and 26 Binks spray gun. A coating of approximately 6 to 8 mil thickness was applied. After each coating, the panel was placed in an oven at ambient temperature and raised to about 525° F. The panel was retained in the oven a sufficient time for the dispersion to melt and flow, that is approximately 20 minutes. The above steps were repeated until the desired total thickness of about 40 mil was achieved. The panel was then baked for approximately 45 minutes at 525° F. The panel was then tested as follows.

The test panel was bent to 160 degree angle and returned to its original position. This procedure was repeated an additional three times. The piece was then completely flattened by hammering on a concrete flor. Sparktesting of the panel at 2,500 volts to check for possible pinholes was conducted. The results achieved were as follows:

No loss of adhesion whatsoever was noted. No evidence of stress to the coating was noted. That is, there were no cracks, stretch marks, or the like. No evidence of electrical contact through the coating whatsoever was noted. Thus, although subjected to a vigorous test, the paint formulation according to the present invention still maintained its durable tough coating without any signs of cracking or the like.

Moreover, applying TEFZEL according to the present invention lends itself virtually to all areas that powder does not, including ease of application and in cost effectiveness. Moreover, small corners and angles are much easier to cover and a greater control of material usage is obtained. Still further, no primer is required and, as noted above, adhesion is remarkably good.

In contrast thereto, when the TEFZEL powder is electrostatically applied and baked, problems are generally encountered as for example with film build. That is, if more than two mils per coat are applied, blistering occurs in the finish film after cure. Another problem which exists is a condition known as the Faraday effect. This is where like charges create repulsion as in corners and on edges. Hence, this condition is detrimental to uniform coverage. The electrostatic process also creates a large amount of waste which only can be resolved by utilizing a reclaimer, a piece of equipment which requires a large capital expenditure. Another problem is that of adhesion when applying the powder. Moreover, todate there has been no primer available to alliviate this problem. The fluidized bed method of application is the least desirable for applying TEFZEL powder, due to the difficulty in controlling film build. Since the parts to be coated must be immersed hot, that is about 600° F., excessive build (over 2 mils) tends to blister. Hence, in most applications, this method is detrimental in accomplishing the desired finish.

While in accordance with the patent statutes, the best mode and preferred embodiment has been set forth in detail in accordance with the patent statutes, the scope of the present invention is to be limited by the scope of the attached claims.

What is claimed is:
1. A dispersion of poly(ethylene tetrafluoroethylene) comprising:
   from about 20 to about 75 parts by weight of the poly(ethylene tetrafluoroethylene);
   from about 7 to about 23 parts by weight of a glycerine;
   from about 2 to about 17 parts by weight of an alkyl phenol ethylene oxide condensate product having from about 9 to about 15 moles of ethylene oxide condensates;
   from about 30 to about 80 parts by weight of water; and
   from about 0.1 to about 3.0 parts by weight of an ethylene glycol monobutyl ether and about 7 to about 30 parts by weight of a hydrocarbon solvent having from 6 to 12 carbon atoms such that a dispersion is formed, and about 0.1 to about 1.0 parts by weight of an anti-sag agent.

2. A dispersion of poly(ethylene tetrafluoroethylene) according to claim 1, wherein the amount of said solvent ranges from about 15 to about 25 parts by weight, wherein the amount of said poly(ethylene tetrafluoroethylene) ranges from about 30 to about 60 parts by weight, wherein the amount of said ethylene glycol monobutyl ether ranges from about 0.5 to about 1.5 parts by weight, and wherein the amount of said solvent ranges from about 25 to about 25 parts by weight.

3. A dispersion of poly(ethylene tetrafluoroethylene), according to claim 1, including from about 0.1 to about 1.5 parts by weight of an antiseparation agent.

4. A dispersion of poly(ethylene tetrafluoroethylene), according to claim 1, wherein said viscosity improver is glycerin is from about 10 to about 14 parts by weight, the amount of said alkyl phenol ethylene oxide condensate product ranges from about 8 to about 12 parts by weight, the amount of said water ranges from about 55 to about 65 parts by weight, the amount of said poly(ethylene tetrafluoroethylene) ranges from about 45 to about 55 parts by weight, wherein the ethylene glycol monobutyl ether is from about 0.8 to about 1.2 parts by weight, wherein said hydrocarbon solvent is toluene and is present in about 18 to about 22 parts by weight and said anti-sag agent is styrene present in from about 0.2 to about 0.7 parts by weight, and wherein said antiseparation agent is di ethylene glycol monobutyl ether and the amount thereof is from about 0.3 to about 1.1 parts by weight.

* * * * *